June 13, 1967  E. PAULO  3,324,905
FILLER HEAD FOR ICE CREAM CARTONS
Filed Feb. 12, 1965  2 Sheets-Sheet 1
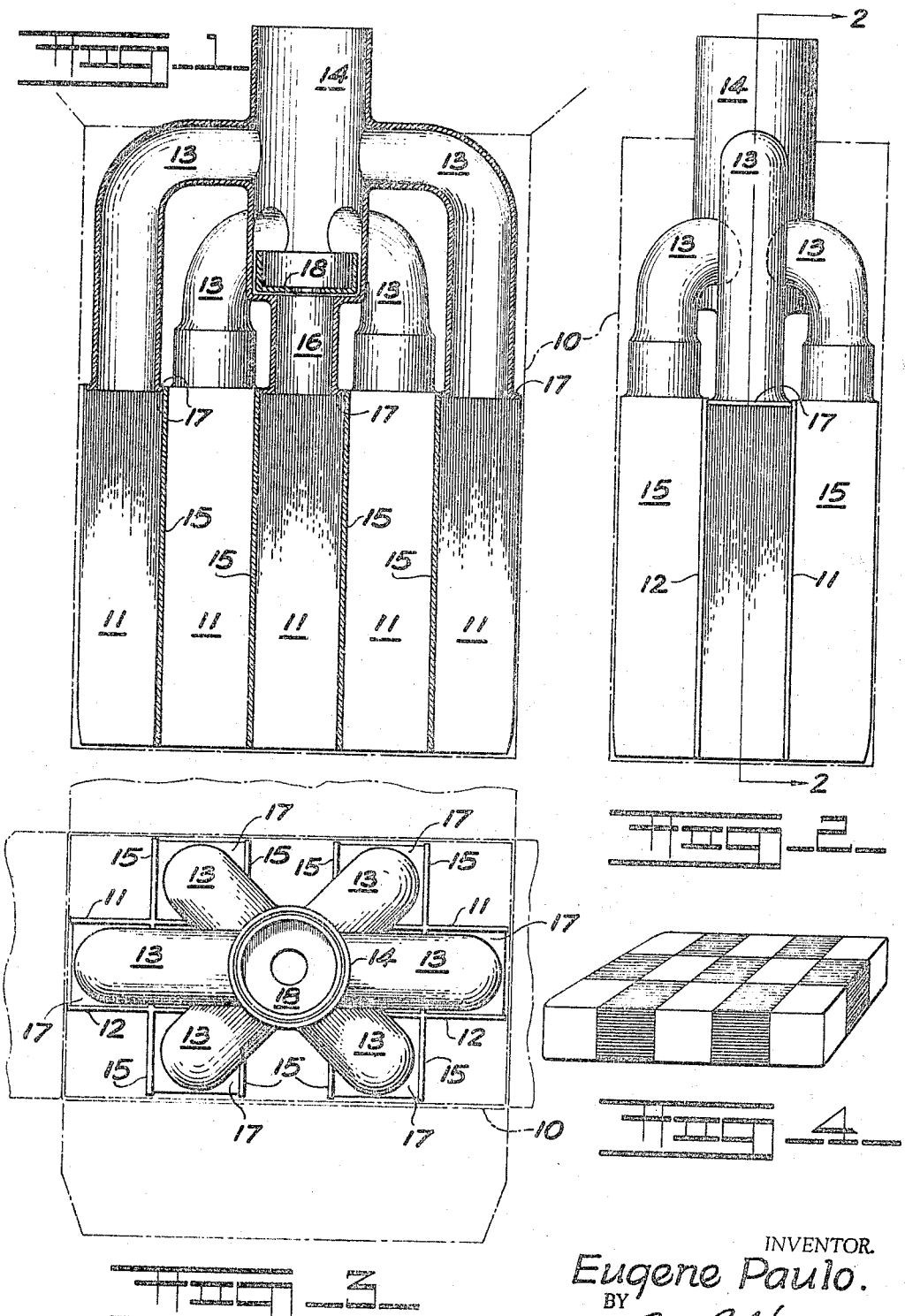
INVENTOR.
Eugene Paulo.
BY
W B Hauptman
ATTORNEY.

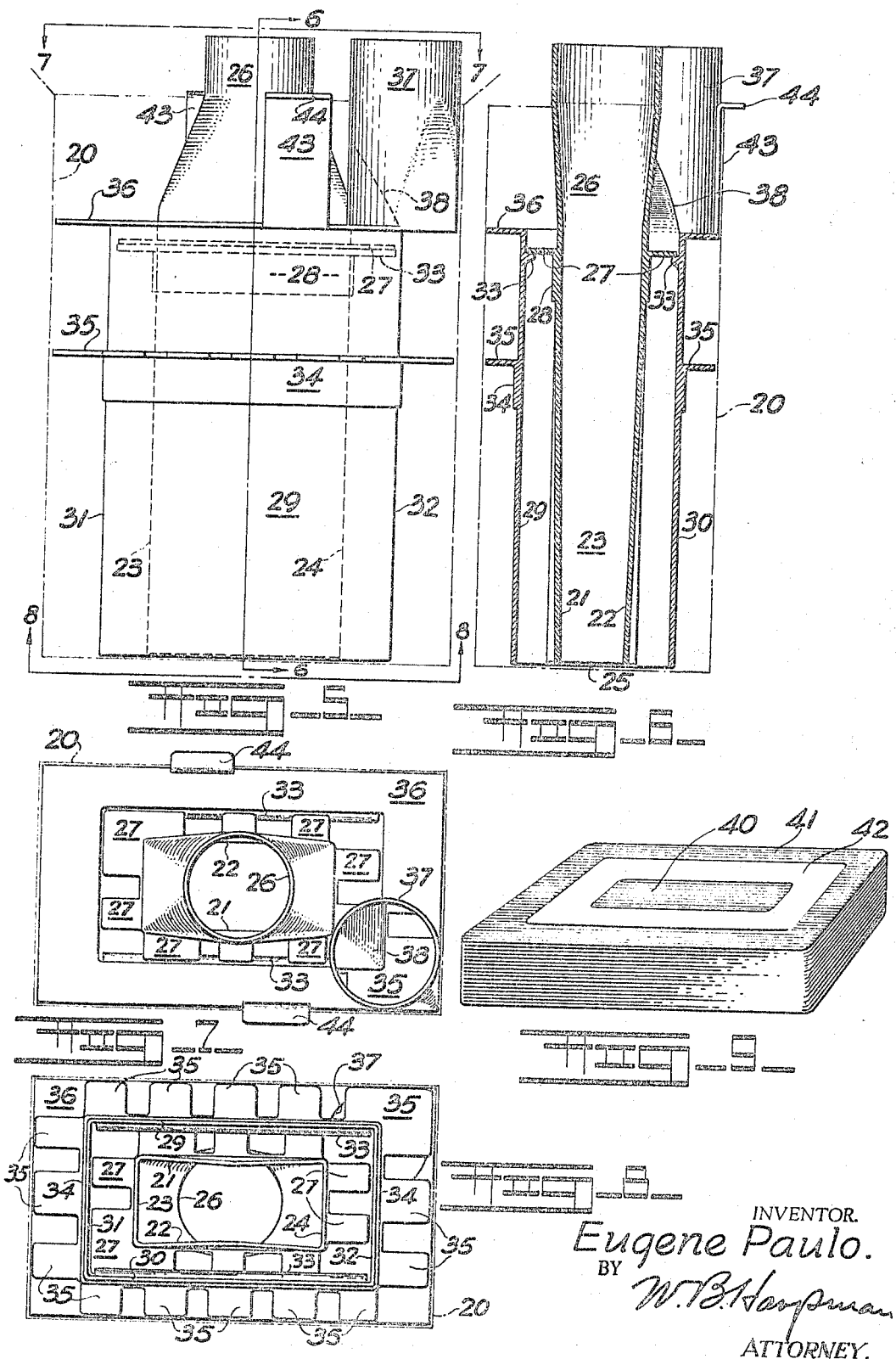

United States Patent Office 3,324,905
Patented June 13, 1967

3,324,905
FILLER HEAD FOR ICE CREAM CARTONS
Eugene Paulo, Youngstown, Ohio, assignor to The Isaly Dairy Company, Youngstown, Ohio, a corporation of Ohio
Filed Feb. 12, 1965, Ser. No. 432,116
9 Claims. (Cl. 141—100)

This invention relates to means for filling ice cream cartons and more particularly to means for filling ice cream cartons with two or more flavors or colors of ice cream and keeping the two or more filled areas separate and distinct so that the different flavors or colors of ice cream extend through the brick of ice cream thus formed.

The principal object of the invention is the provision of a filler head for ice cream cartons that will divide the ice cream carton into a plurality of areas and supply different flavors or colors of ice cream to the different areas and maintain the separation as the carton filler head is withdrawn from the carton.

A further object of the invention is the provision of a filler head for filling ice cream cartons that will uniformly and evenly fill various selected areas of the ice cream carton with different flavors or colors of ice cream.

A still further object of the invention is the provision of a filler head for filling ice cream cartons that may be easily disassembled and cleaned after use.

A still further object of the invention is the provision of a filler head for filling ice cream cartons that permits the simple and inexpensive formation of bricks of ice cream with various flavors or colors extending therethrough and maintaining distinct lines of division therebetween so as to make possible the formation of various patterns, checkerboards or other designs in the ice cream brick thus formed.

The filler head disclosed herein makes possible the filling of ice cream cartons with more than one color or flavor of ice cream and thereby makes the ice cream more attractive. This is particularly true when the ice cream is placed in the carton in a desired design so that when the subsequent ice cream brick is sliced crosswise, it repeats the design in each slice. For example, a checkerboard design can be formed with the filler head disclosed herein wherein the ice cream in the carton is divided into fifteen equally sized spaces extending vertically of the carton or longitudinally of the brick of ice cream formed therein. When the brick of ice cream so formed is cut transversely as customary, the checkerboard appearance exists in each of the slices cut from the brick.

Alternate arrangements are possible and sometimes desirable, and will occur to those skilled in the art.

With the foregoing and other objects in view which will appear as the description proceeds, the invention resides in the combination and arrangement of parts and in the details of construction hereinafter described and claimed, it being the intention to cover all changes and modifications of the example of the invention, herein chosen for purposes of the disclosure, which do not constitute departures from the spirit and scope of the invention.

The invention is illustrated in the accompanying drawing, wherein:

FIGURE 1 is a vertical section through a filler head arranged to form a plurality of longitudinally extending areas of different colored or flavored ice cream in an ice cream carton being filled.

FIGURE 2 is a side elevation of the filler head seen in FIGURE 1, section lines 2—2 on FIGURE 2 indicating the section of FIGURE 1.

FIGURE 3 is a top plan view of the filler head seen in FIGURES 1 and 2.

FIGURE 4 is a perspective view of a slice of ice cream from a brick of multi-flavored or colored ice cream formed by the filler head in FIGURES 1, 2 and 3 of the drawings.

FIGURE 5 is a plan view of a modified form of filler head.

FIGURE 6 is a vertical section on line 6—6 of FIGURE 5.

FIGURE 7 is a top plan view of the filler head seen in FIGURES 5 and 6.

FIGURE 8 is a bottom view of the filler head seen in FIGURES 5, 6 and 7.

FIGURE 9 is a perspective view of the slice of ice cream from a brick of ice cream formed by the three flavor or color filler heads of FIGURES 5 through 8.

By referring to the drawings, and FIGURES 1, 2 and 3 in particular, it will be seen that a filler head has been disclosed which when positioned in an ice cream carton to be filled and supplied with ice cream in the form of a thick flowable liquid delivered to the filler head from two ice cream machines, as known in the art, will form a pattern of fifteen checkerboard-like squares with the alternate squares of the checkerboard design being filled with different colors or flavors of ice cream. The carton is illustrated in broken lines and indicated by the numeral 10.

Still referring to FIGURES 1, 2 and 3 of the drawings, it will be seen that there are a pair of vertically positioned, horizontally spaced first partition members 11 and 12 respectively which extend the full width of the filler head as seen in FIGURES 1 and 3 of the drawings. The partition members 11 and 12 extend vertically from the bottom of the head to a point intermediate the upper and lowermost portions thereof where they terminate and join a plurality of tubular conduits 13 which extend vertically and then inwardly to a central tubular supply pipe 14 with which they communicate. A plurality of spaced transversely positioned second partition members 15 are secured in sealing engagement at their points of contact with the first partition members 11 and 12 and define therewith a plurality of uniformly spaced cross-sectionally square areas in a checkerboard pattern, as best seen in FIGURE 3 of the drawings.

It will be observed by referring to FIGURES 1, 2 and 3 of the drawings that the tubular conduits 13 communicate with the alternate squares formed by the first partitions 11 and 12 and second partitions 15. Thus, the tubular conduits 13 extend to six of the squares defined by the first partitions 11 and 12 and the second partitions 15, and an opening and short vertical tubular conduit 16 in axial alignment with the central tubular supply pipe establishes communication with the centralmost square as best seen in FIGURE 1 of the drawings.

The cross-sectionally circular tubular conduits 13 and 16 have square end portions 17 secured to their delivery ends which are their lower ends, and which square end portions are centrally apertured so as to direct ice cream delivered downwardly through the conduits 13 and 16 as seen in FIGURES 1 and 2 of the drawings into the adjacent alternate squares formed by the first partitions 11 and 12 and second partitions 15, as heretofore described.

It will be observed that when the filler head is in position in a carton as shown in broken lines in FIGURE 10, the carton 10 will form a rectangular wall in closing the front and back and sides of the filler head and contacting the outermost ends of each of the first partition members 11 and 12 and each of the outer ends of the second partition members 15. When ice cream is delivered to the central tubular supply pipe 14 from an ice cream machine, it will be obvious that it will flow into the tubular supply pipe 14 and then into the tubular conduits 13 and 16 so that it will thus be delivered into the adjacent alternate squares formed by the first partition members 11 and 12 and second partition members 15.

A flow control valve taking the form of an apertured flanged disc 18 is positioned in the lower end of the central tubular supply pipe 14 as best seen in FIGURES 1 and 3 of the drawings, and is so sized that its aperture restricts the flow of the ice cream axially into the tubular conduit 16 and its flange restricts the flow outwardly through the tubular conduits 13 immediately thereabove and thus equalizes the flow of the ice cream through all of the tubular conduits 13 and the tubular conduit 16 as will be obviously desirable so that the square areas between the first partition members 11 and 12 are the second partition members 15 will be evenly and uniformly filled. While this particular filling operation is taking place, the delivery member (not shown) from a second ice cream machine supplying a different flavor and/or color of ice cream is positioned in the carton alongside the central tubular supply pipe 14 of the filler head as heretofore described, and the ice cream therefrom will thus be able to flow downwardly into the adjacent alternate squares that are not supplied by the tubular conduits 13 and 16, heretofore referred to. The ice cream from the second ice cream machine will not be able to mix with the ice cream being supplied through the central tubular supply pipe 14 by reason of the square end members 17 which form closures with respect to the adjacent alternate squares with which the tubular conduits 13 and 16 communicate. Thus, as the carton 10 is moved away from the filler head 14, the two colors and/or flavors of ice cream will be deposited uniformly therein in a pattern conforming with the arrangement of the first partition members 11 and 12 and the second partition members 15 so that when the carton is filled and the filler head completely withdrawn therefrom, the ice cream in the carton comprises a plurality of vertical columns of alternately spaced colors or flavors of ice cream in a checkerboard pattern.

When the ice cream in the carton is hardened and then removed from the carton and sliced transversely thereof as customary in slicing brick ice cream, a checkerboard slice of ice cream as illustrated in FIGURE 4 of the drawings is thus obtained with each of the checkerboard-like squares having a different adjacent color and/or flavor, which produces a novel and practical and attractive form of ice cream. For example, the ice cream machines filling the carton through the filler head thus described may be supplied with chocolate and vanilla ice cream wherein a checkerboard-like pattern of brown and white ice cream will be realized in the slice as seen in FIGURE 4 of the drawings. Alternately, the ice cream machines may supply vanilla and strawberry, whereby a pink and white checkerboard design will be formed. Other color combinations and/or flavor combinations will occur to those skilled in the art.

In a preferred embodiment of the invention, the tubular conduits 13 and 16 and the central supply pipe 14 are supplied in an integral assembly and the centrally apertured square end portions 17 are affixed directly to the ends of the tubular conduits 13 and 16 as heretofore described. The lower portion of the filler head comprising the first partition members 11 and 12 which run in one direction and the second partition members 15 which are positioned at right angles thereto and spaced relative to one another are separately formed and thus the device may be readily taken apart and cleaned and quickly reassembled and used in forming the desirable and attractive ice cream brick as hereindescribed. It will be obvious to those skilled in the art that various cross sectionally shaped tubular members may be secured to the delivery ends of the tubular conduits 13 and 16 and positioned in the carton rather than the first partition members 11 and 12 and the second partition members 15 and that when ice cream is directed therethrough as hereinbefore described, various other designs and configurations of the two-color ice cream may thus be obtained. For example, when cross sectionally circular tubular members are used, the resulting brick of ice cream has a solid body of one color with a plurality of vertically extending separate and distinct circular areas of another color of ice cream, and these may be alternately shaped in the configuration of hearts, flowers, or any other design in which the tubular member may be provided.

A still further modification will occur to those skilled in the art and wherein a brick of ice cream may be formed with an outer layer of one flavor, an inner layer of a different flavor or color of ice cream, and a central area of still another flavor or color of ice cream. By referring to FIGURES 5 through 8 of the drawings a filler head of this modification may be seen, and in FIGURE 9 of the drawings a slice from a brick of ice cream formed with such a three-color head may be seen.

By referring to FIGURES 5 and 6 of the drawings broken line representations of an ice cream carton to be filled may be seen and are indicated by the numeral 20. The filler head capable of filling the carton as hereinbefore described comprises an innermost rectangular walled structure having front and back walls 21 and 22 respectively and end walls 23 and 24 respectively. The walls 21, 22, 23 and 24 define a centermost area open at the bottom and the top as seen in FIGURE 6 of the drawings, wherein the bottom is indicated by the numeral 25 and the top is seen in communication with a tubular conduit 26. A plurality of outwardly extending tabs 27 are formed on a sleeve 28 which is positioned around and against the outer surface of the four walls 21, 22, 23 and 24 of the inner chamber form. A secondary rectangular walled structure is formed of front and back wall portions 29 and 30 and is substantially larger than the rectangular structure defined by the walls 21, 22, 23 and 24 heretofore described so that the walled structure 21, 22, 23 and 24 can be positioned within the walls 29 and 30 and within the end walls 31 and 32 thereof to form a rectangular chamber completely about the exterior of the first rectangular device formed of the walls 21, 22, 23 and 24.

A shoulder 33 extends around the inside of the secondary rectangular chamber form formed of the walls 29, 30, 31 and 32 as best seen in FIGURES 5 and 6 of the drawings, and the ends of the tabs 27 rest on the shoulder 33 as well as engage the adjacent inner surfaces of the walls 29, 30, 31 and 32 to appropriately space the inner rectangular chamber with respect to the outer rectangular chamber. This second rectangular chamber formed of the walls 29, 30, 31 and 32 has a secondary sleeve 34 thereabout which is provided with a plurality of spaced outwardly extending tabs 35. The upper end of the secondary rectangular member has a rectangular closure plate 36 having a rectangular opening therein of a size so that the rectangular plate 36 forms in effect an outwardly extending flange on the upper end of each of the walls 29, 30, 31 and 32 which form the secondary rectangular chamber.

The outermost edges of the rectangular plate 36 are of a size that fit closely within the ice cream carton 20, and a similar spacing arrangement is achieved by the tabs 35, the outer edges of which also contact the inner walls of the ice cream carton 20.

A secondary tubular conduit 37 is positioned on the rectangular plate 36 and has a restricted angular lower end portion 38 so that it communicates only with the right angular area on the outside of the secondary rectangular member formed by the walls 29, 30, 31 and 32.

It will thus be seen that when the discharge tube of an ice cream machine is connected with the tubular conduit 26, the ice cream from that machine will flow downwardly through the conduit 26 and into the innermost rectangular chamber defined by the walls 21, 22, 23 and 24 and thus form the core of the ice cream brick which in the embodiment illustrated is of rectangular shape as shown in the slice of ice cream from a brick so formed and illustrated in FIGURE 9 of the drawings.

It will further be seen that when the discharge tube of a second ice cream machine is connected with the tubular conduit 37, the ice cream from that machine which is preferably of another flavor or color will be delivered to the area within the carton 20 and outside of the walls 29, 30 31 and 32 which define the secondary rectangular chamber. The discharge tube of a third ice cream machine is then directed into the top of the ice cream carton where the ice cream from the third machine will flow downwardly between the tabs 27 and into the rectangular area between the two rectangular chambers. The ice cream will thus fill the area between the rectangular walls 29, 30, 31 and 32 and the inner rectangular member formed of the walls 21, 22, 23 and 24.

By referring to FIGURE 9 of the drawings, it will be seen that the ice cream supplied through the tubular conduit 26 will form the rectangular center core 40, ice cream supplied through the tubular conduit 37 will form the outer rectangular layer 41, and the ice cream which is directed into the carton and downwardly between the spacing tabs 27 will form the layer of ice cream between the core 40 and the outer layer 41 and which layer is indicated by the numeral 42.

Still referring to the drawings and FIGURE 7 in particular, it will be apparent that this method of filling an ice cream carton is efficient and may be rapidly and easily performed. The tubular conduits 26 and 37 will be automatically supplied by the ice cream machines connected thereto, and the third ice cream machine will direct its discharge into the areas comprising the top of the carton and thus easily flow downwardly through the spaces between the tabs 27 into the secondary rectangular area.

By referring now to FIGURE 8 of the drawings, a bottom view of the three color of flavor filler head may be seen, and the inner and outer rectangular chambers formed by the walls 21, 22, 23 and 24 and the walls 29, 30, 31 and 32 may be seen as may be the tabs. The upper end of the rectangular chamber formed by the walls 29, 30, 31 and 32 is provided with a pair of oppositely disposed upwardly extending arms 43, and which arms are preferably provided with outturned flanges 44 on their uppermost ends. These provide convenient means for holding the three color filler head when it is lowered into a carton, or alternately they act as limiting guides when a carton is moved upwardly over the filler head and ice cream deposited in through the separate and distinct channels as hereinbefore described.

It will thus be seen that a modification of the invention has been disclosed which enables a three color ice cream brick to be formed and wherein the colors or flavors form a central core, a layer thereabout, and an outer or covering layer surrounding the core and first layer so that when the brick is sliced transversely as customary the unique appearance seen in FIGURE 9 of the drawings is obtained.

It will occur to those skilled in the art that the shapes of the rectangular chambers which have been described herein in their preferred embodiment may be altered. For example, they may be circular or they may be scalloped or otherwise changed in appearance so long as they define separating walls with respect to the chambers in which the ice cream is delivered. In any event, the three color head effectively forms an ice cream brick with three colors or flavors which is highly desirable in the industry.

It will thus be seen that a preferred embodiment of the invention as set forth in FIGURES 1 through 3, and the product produced thereon as seen in FIGURE 4, has been disclosed which meets the several objects of the invention, and that a modification illustrated in FIGURES 5 through 8 and the product produced therewith, as seen in FIGURE 9, also meets the several objects of the invention and having thus described my invention what I claim is:

1. A filler head for filling ice cream cartons and comprising partition means dividing the area within the carton into a plurality of separate chambers, tubular means for directing ice cream from a first source into at least one of said separate chambers, closure members about said tubular means registrable with said partition means whereby ice cream from a second source may be delivered into the other of said separate chambers with said closure members preventing intermixing of said ice creams.

2. The filler head set forth in claim 1 and wherein the partition means comprises several vertically standing flat wall members.

3. The filler head set forth in claim 1 and wherein the partition means comprises several vertically standing flat wall members arranged in a checkerboard pattern.

4. The filler head set forth in claim 1 and wherein the partition means comprises several tubular members placed one within the other in spaced relation.

5. The filler head set forth in claim 4 and wherein the tubular members are rectangular in cross section.

6. A filler head for filling ice cream cartons and comprising a plurality of first parallel vertically standing plates spaced with respect to one another and a plurality of secondary parallel vertically standing plates spaced with respect to one another and positioned crosswise of said plates in an egg crate arrangement open at its upper and lower ends, a plurality of tubular conduits detachably engaging alternate areas between said plates at their upper ends, members closing said areas between said tubular conduits and said plates and means for directing ice cream into said tubular conduits.

7. A filler head for filling an ice cream carton and comprising a first tubular member open at its top and bottom, a plurality of spaced tabs on the exterior of said tubular member arranged to engage said carton, a secondary tubular member open at its top and bottom positioned within said first tubular member, a plurality of secondary spaced tabs on the exterior of said secondary tubular member arranged to engage the interior of said first tubular member, a tubular conduit engaging the top of said secondary tubular member, a secondary tubular conduit positioned on the top of said first tubular member, a closure member in said secondary tubular member closing it with respect to the interior of said first tubular member and arranged to direct ice cream into the area around the exterior of said first tubular member and within said carton.

8. The filler head set forth in claim 7 and wherein means is provided on the interior of said first tubular member for supporting said secondary tabs and secondary tubular member relative thereto.

9. The filler head set forth in claim 7 and wherein the tubular members are rectangular in cross section.

References Cited

UNITED STATES PATENTS

| | | | |
|---|---|---|---|
| 2,067,750 | 1/1937 | Bagby | 141—100 X |
| 2,145,240 | 1/1939 | Adams | 141—105 X |
| 3,228,356 | 1/1966 | Schafer | 107—1.4 |

LAVERNE D. GEIGER, *Primary Examiner.*

H. S. BELL, *Assistant Examiner.*